United States Patent

Guerra

[11] 4,038,669
[45] July 26, 1977

[54] CRYOGENIC CAMERAS

[76] Inventor: John Michael Guerra, 186 Waltham St., W. Newton, Mass. 02165

[21] Appl. No.: 562,948

[22] Filed: Mar. 27, 1975

[51] Int. Cl.² .................................................. G03B 29/00
[52] U.S. Cl. ........................................ 354/76; 354/354
[58] Field of Search .................... 354/64, 75, 76, 202, 354/354, 288

[56] References Cited

U.S. PATENT DOCUMENTS

| | | | |
|---|---|---|---|
| 3,289,557 | 12/1966 | Garcia et al. | 354/75 |
| 3,667,358 | 6/1972 | Williams | 354/354 |
| 3,860,937 | 1/1975 | Wolfe | 354/64 |

Primary Examiner—L. T. Hix
Assistant Examiner—Alan Mathews

[57] ABSTRACT

A Cryogenic Camera in which an aluminum refrigeration chamber filled with dry ice or liquid nitrogen makes contact with the back of a metallic filmholder upon closing the hinged back of the camera, to which the refrigeration chamber is bolted. The filmholder is positioned within the camera body so as to form a small volume in front of the film. This volume contains a silica gel dessicant packet that absorbs moisture in this volume, which is sealed upon closing the aforementioned hinged back. Thus frosting of the film and of the Plexiglas window that seals the camera aperture is prevented. The presence of this volume allows integration of an off-axis guide system within the camera, the guide system consisting of a flip-up mirror, rheostat controlled illuminated crosshairs, and a focussing eyepiece. The crosshairs illumination is provided by a red light emitting diode powered by two penlight cells contained within the volume. With a converted filmholder, both ground glass and Foucault knife-edge focussing of the camera is made possible.

1 Claim, 9 Drawing Figures

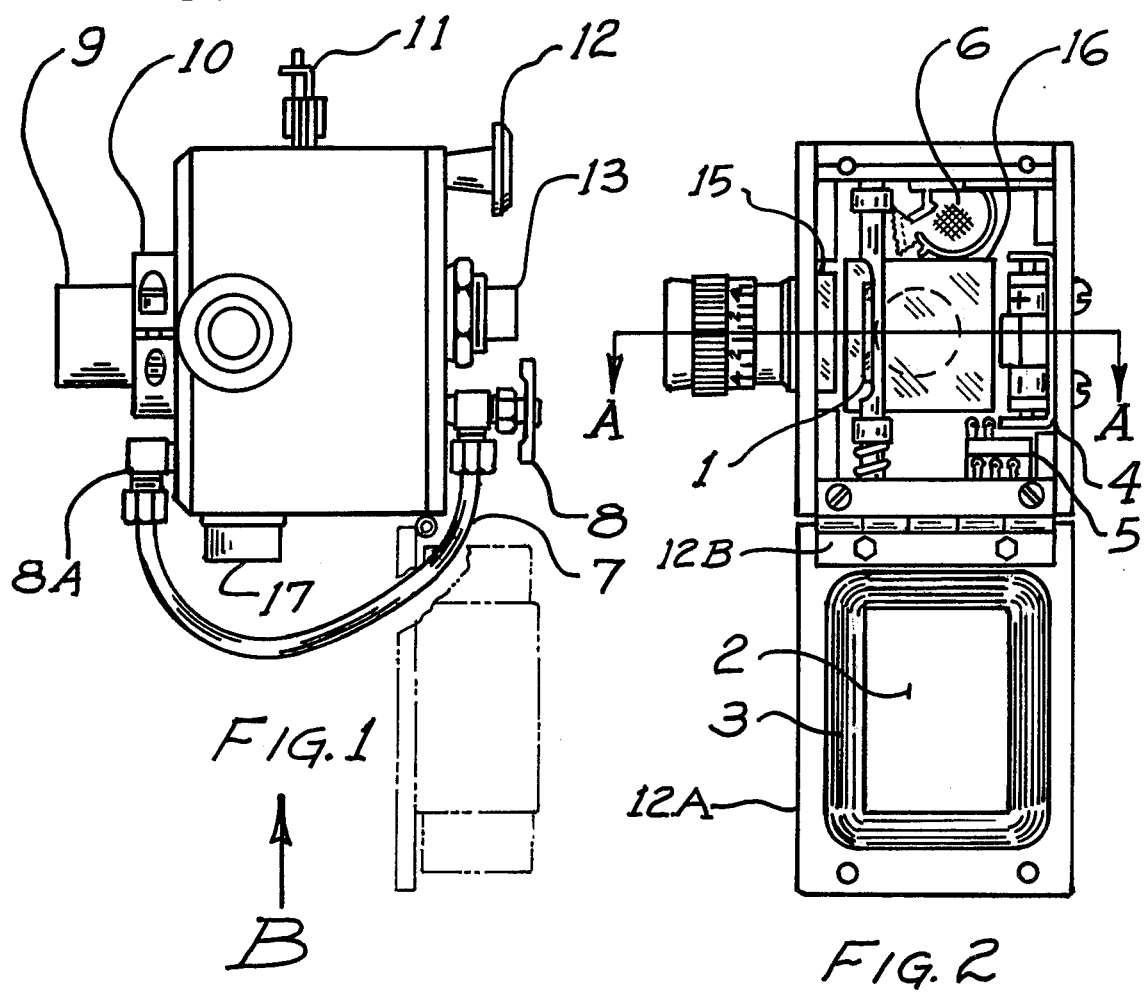

CRYOGENIC CAMERAS

The present invention relates to improvements in astronomical photography and astrophotographic equipment and, more particularly, to novel and improved cryogenic cameras of economical manufacture and ease of operation, increased effectiveness, and accuracy, which lower the temperature of the film to cryogenic temperatures and thereby decrease the exposure time and increase the accuracy of color rendition of color films used in long astrophotographic exposures.

Because the amount of light received from astronomical objects is extremely faint, and because the average astrophotographic system is of slow speed (on the order of F/7), and because of reciprocity failure of the photographic emulsion, time exposures in astrophotography are often quite long, on the order of a half hour to as much as two hours. Since atmospheric turbulence and guidance errors inherent in the telescope's drive mechanism accumulate with time, the resolution of the final image of long exposure is decreased markedly. One of the most successful methods of reducing astrophotographic exposures is the use of refrigerated cameras. In this method, the film temperature is lowered to cryogenic temperatures, thus hindering the recombination of the dissociated ions in the photographic emulsion. This recombination, known as reciprocity failure, begins to take place after about a minute and increasingly lowers the sensitivity of the photographic emulsion. While cooling the film lowers somewhat the intrinsic sensitivity of the film, it disproportionately suppresses reciprocity failure, resulting in a net substantial gain in "speed". However, the lower temperature of the film and camera causes condensation of atmospheric moisture in the camera, thus frosting the film surface and lens of the camera, of course rendering photography impossible. This problem has been surmounted in the past by two main methods. The first method involves evacuation of the film chamber with a vacuum pump, thus eliminating moisture and frosting. This method is costly, and most cumbersome, because of the need for a pump, to be use on smaller telescopes. The second method involves the use of a thick Lucite optical plug which is pressed firmly against the film surface, thus preventing contact of the film surface with the air and the cold with the front surface of the plug. This method is also very costly because of the optical plug of such thickness (about 2 inches), and is restricted in its use of film format to small sizes and to the refrigerant of dry ice. In accordance with the present teachings, however, the problem of moisture condensation and resultant frosting is solved economically and simply by the insertion of a silica gel moisture absorption packet into a sealed film chamber. The sealed chamber is designed to be of the minimum possible space so that the moisture present is also at a minimum and can be readily and efficiently absorbed by the silica gel packet. In addition, the minimum film chamber is still of sufficient size to accomodate an off-axis illuminated guide system, with a reflex mirror arrangement. In addition, the design allows the convenience of use of several film formats, three focussing methods, and several refrigerants.

It is one of the objects of the present invention, therefore, to provide a novel and improved cryogenic camera wherein frost prevention is made both simple and economical by means of integrating moisture-absorbing silica gel packets into a film chamber of intentional minimal volume.

Another object is to provide accurate through-the-lens guiding by means of an off-axis guide system with a reflex mirror and variable-illuminated crosshairs.

Still further, it is an object to provide a refrigeration arrangement that is able to utilize both dry ice and liquid nitrogen, to the convenience of the operator's ability to obtain either refrigerant.

And further, it is an object to give the operator the freedom of using several different film formats.

Finally, it is an object to provide a camera that may be focussed in three separate ways, thus adding to the accuracy and convenience of the camera.

By way of summary account of practise of this invention in one of its aspects, a generally rectangular parallelepiped of 0.25 inch black opaque Plexiglas with a 1.25 inches aperature on the frontpiece, to which a 1.25 inches O.D. brass tube and collar assembly is attached to allow insertion of the camera into the standard 1.25 inches I.D. focussing amount of telescopes. The camera body is generally about the same width and length as the filmholder, which is inserted through an entrance slot on the side of the camera, and rests on Plexiglas runners. The hinged back of the camera, to which is attached the aluminum refrigerant chamber, is then closed and secured to the camera with two knobs, ensuring even contact of the aluminum refrigerant chamber with the back of the aluminum filmholder. Thus the filmholder is also pressed against the Plexiglas runners and foam gasket at the entrance slot, completely sealing the film-chamber from extraneous light and moisture. A brass reducing bushing inserted into the Plexiglas back plate allows filling of the refrigerant chamber with the refrigerant. A petcock exhaust valve, also on the back plate, allows gas pressure from the chamber to be bled off. When nitrogen is used as the refrigerant, the bleed off is directed into the film chamber through a flexible tubing from the petcock valve to a 90° elbow fitting on the frontpiece. The nitrogen gas aids in the prevention of moisture in the film chamber. Two knobs on the opposite side of the filmholder entrance slot allow the adjustment of the reflex mirror from flip-up to 45° position and the intensity of the illumination in the guide system from off to bright. The guide eyepiece is on the top of the camera, directly over the film chamber. Inside the film chamber, along the walls, are the battery holder, rheostat-switch, silica gel packet and clamp, mirror assembly, and the illuminated crosshairs unit. An optical window of 0.25 inch thickness seals the 1.25 inches aperature.

Although the aspects of this invention which are believed to be novel are set forth in the appended claims, additional details as to preferred practises of the invention and as to further objects, advantages and features thereof may be most readily comprehended through reference to the following description taken in connection with the accompanying drawings, wherein:

FIG. 1 is a top view (plan) of one cryogenic camera in which the present teaching are exploited to advantage;

FIG. 2 is a plan view of a cryogenic camera such as that illustrated in FIG. 1, with the hinged back opened completely to allow removal of the filmholder and with the filmholder removed to permit access to the film chamber, refrigeration chamber, and interior in general.

FIG. 3 is a cross-sectional side view of the camera illustrated in FIG. 1. (The guide eyepiece is in pictorial view).

Figure 6:
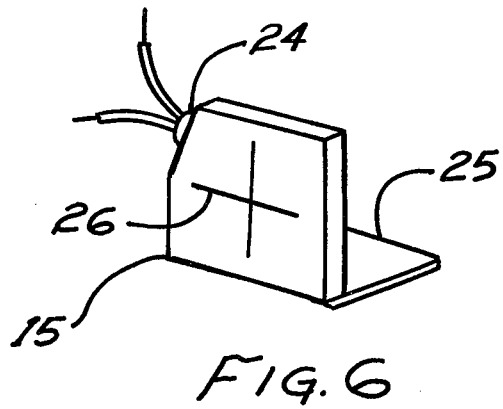

FIG. 6 provides a detail of the illuminated-crosshairs unit with the Light Emitting Diode and light shield in place.

Figure 7:
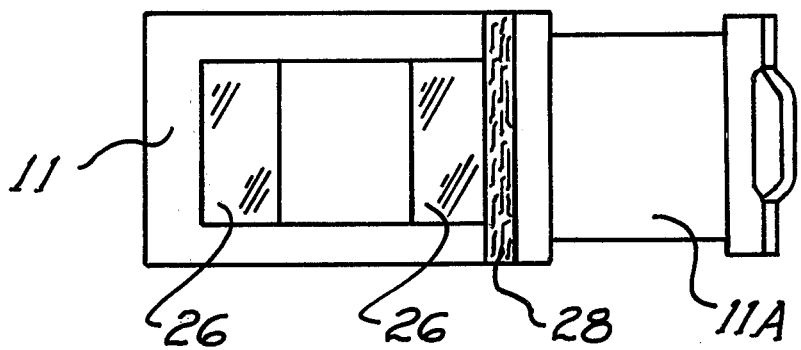

FIG. 7 provides a detail of the roll film adaptor plates in place in the filmholder, and the template used to size the film for this arrangement.

Figure 8:
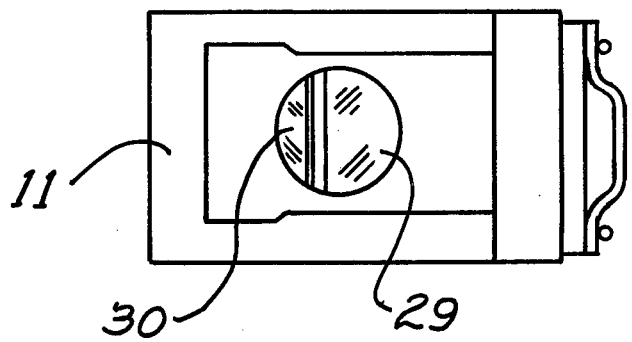

FIG. 8 is a pictorial view of the focussing device, showing both the ground glass screen and the Foucault knife edge.

Figure 9:
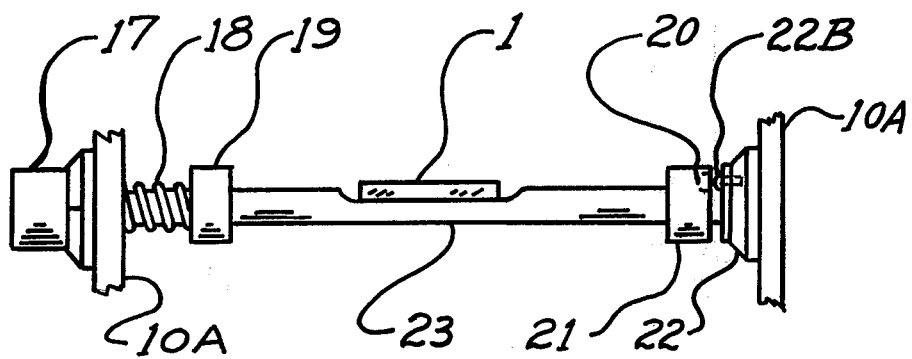

FIG. 9 is a detail of the reflex mirror arrangement, displaying the angle-lock device.

The assembly illustrated in FIG. 1 represents a completely portable and independent cryogenic camera which offers in one integrated structure a through-the-lens illuminated guidance system with reflex mirror and convenient, simple frost-free refrigeration of the film. Rectangular parallelopiped body 10A is attached to the given telescope (equipped with the standard 1.25 inches Inside diameter eyepiece holder) by insertion of the 1.25 inches Outside diameter blackened tube of 2 inches length into the said eyepiece holder. No other mount is needed for the camera. This 1.25 inches O.D. adaptor tube is connected to the camera by the split collar 10 of 2 inches O.D. and 0.5 inch thickness; tightening of the hex-head socket screws on the split collar keep the adaptor tube rigidly in place. Into this split collar are drilled three countersunk holes that accommodate three socket hex-head bolts (¼-20 × ½ inch) which screw into the aforesaid tapped holes in the front plate of the camera body 10A. The camera body 10A is constructed of ¼ inch black opaque Plexiglas, the pieces of which are cement-fused together for simplicity, rigidity, and complete sealing of the abutting edges. The thermal properties of Plexiglas are such that the body of Plexiglas provides added insulation of the cryogenic interior from the operator's hands and parts not to be cooled (i.e. eyepiece 14, knobs 17, 12, adaptor assembly 9, 10, tube 7, and fittings 8, 8A). The filmholder 11 is inserted with the hinged back 12A in open position. The filmholder rests on and is held parallel to the image plane by the Plexiglas runners 15A visible in FIG. 2. These runners are cemented to all the contacting sides of the camera body 10A, thus adding extra rigidity to the construction. The filmholder is held rigidly in place and the film chamber thus sealed from moisture by closing the hinged back 12A so that the threaded rods 8A protrude through the holes 8B in the hinged back. The aforesaid rods (¼-20 × 1.25 inches) are tapped into the double-thickness side 8C. Two knobs 12 are then screwed onto the protruding segment of the rods 8A and are turned hand-tight against the Plexiglas hinged back. The refrigeration chamber 2 in FIG. 2 is now pressing tightly against the back of the filmholder, so that this single operation of closing and securing the hinged camera back completes three functions: securing the filmholder in place so that the shutter slide 11A may be pulled manually to begin the exposure, without movement of the filmholder; sealing the film chamber from outside atmosphere and thus moisture; insuring refrigeration of the film through conduction by means of the close contact of the aluminum refrigeration chamber with the aluminum back (actually the partition with the back slide removed for access) of the filmholder. The aluminum (2) refrigeration chamber is 2.75 inches long, 1.5 inches deep, 2.0 inches wide with a plate thickness of 3/32 inch and is attached to the hinged back 12A by four socket hex-head bolts 2A seen in the cutaway view of the refrigeration chamber in FIG. 2. The center of the refrigerant chamber coincides with the center of the hinged back. A petcock valve is tapped into the Plexiglas hinged back and enters into the film chamber to allow exhaust of vaporized refrigerant. The petcock valve 8 in FIG. 1 has a 5/16 inch thread diameter. A flexible tube 7 in FIG. 1 connects this petcock valve 8 to the 90° elbow fitting 8A in FIG. 1 at the frontpiece of the camera. When the tube 7 is in this arrangement, the gases from the refrigeration chamber 2 enter into the film chamber; this is done only when the refrigerant used is liquid nitrogen, as the bleed-off nitrogen gas helps repel moisture from the film chamber. When other refrigerants are used, a hose clamp is placed on the tube 7. The entrance for the refrigerant is a ¾ inch inside diameter brass reducing bushing 13 in FIG. 1 which is threaded on the inside to allow the brass plug 13 to be screwed into the entrance, thus sealing the chamber. The petcock valve 8, the reducing bushing 13, the elbow fitting 8A, and the refrigeration chamber 2 are all caulked and sealed with silicone rubber sealant, which provides for a flexible surface to absorb contraction and expansion of abutting materials so that stress is alleviated. The hinged back is secured to the camera by the brass piano hinge 12B in FIG. 2. The back is bolted to the hinge 12B by two brass ¼-20 machine screws and the hinge is bolted to the upper wall of the body (of double thickness, i.e. ½ inch Plexiglas) by two brass machine screws that are tapped into holes in the camera body. Fiberglas insulation 3 in FIG. 2 or aluminum foil-coated foam rubber is rapped around the refrigeration chamber 2 and fastened; this insulation provides longer refrigerant life and protection of the camera body from the extreme cryogenic temperatures.

Focussing of the cryogenic camera may be accomplished in one of three ways. First, with the hinged back 12A in open position and filmholder removed, as in FIG. 2, the focussing device in FIG. 8 is inserted into the camera in the same manner as insertion of the filmholder. The focussing device consists of a 2.25 inches × 3.25 inches sheet-filmholder 11 in which a 1⅜ inches diameter hole is drilled. Positioned in between the middle partition of the filmholder and the exposure slide 11A are a 1 inch × 2 inches piece of fine grade ground glass (3/16 inch thickness) and a knife edge 30 (single-edged razor of standard size used in, for example, lineoleum knives) positioned adjacent to the ground glass. Both the knife edge and the ground glass 31 are positioned with adjacent edges parallel and mutually perpendicular to the length of the filmholder; a 3/16 inch gap is left between them, and this gap is off-center towards the closed end of the filmholder by ¼ inch. This arrangement is illustrated in FIG. 8. With the said focussing device in place in the camera, and with the hinged back in open position as in FIG. 2, the desired subject image is then focussed on the ground glass by moving the camera in and out of the telescope's focal plane by means of the "rack & pinion" or other device on the eyepiece holder of the telescope itself. The Foucault method of focussing (or finding the focal plane) may be used with added accuracy with the knife edge that is incorporated into the focussing device. Once the focus point has been found in this manner and the position marked on the telescope's eyepiece holder, the guide eyepiece may be used for future focussing. This is the most convenient of the three methods of focussing.

Figure 4:
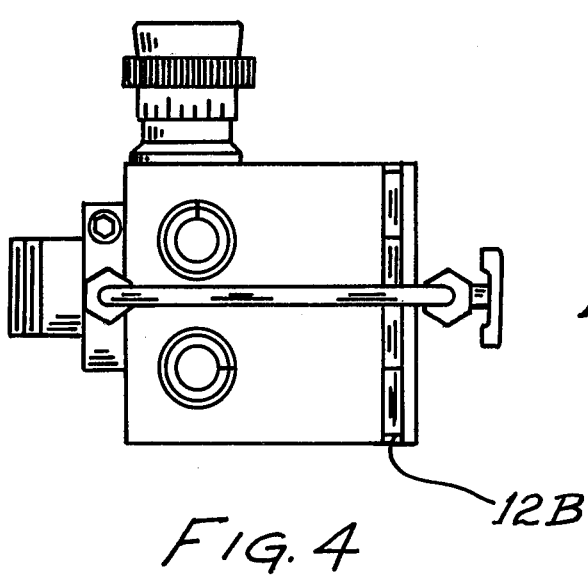
FIG. 4 is a pictorial view of the cryogenic camera as seen in FIG. 3, displaying the control knobs.
Figure 5:
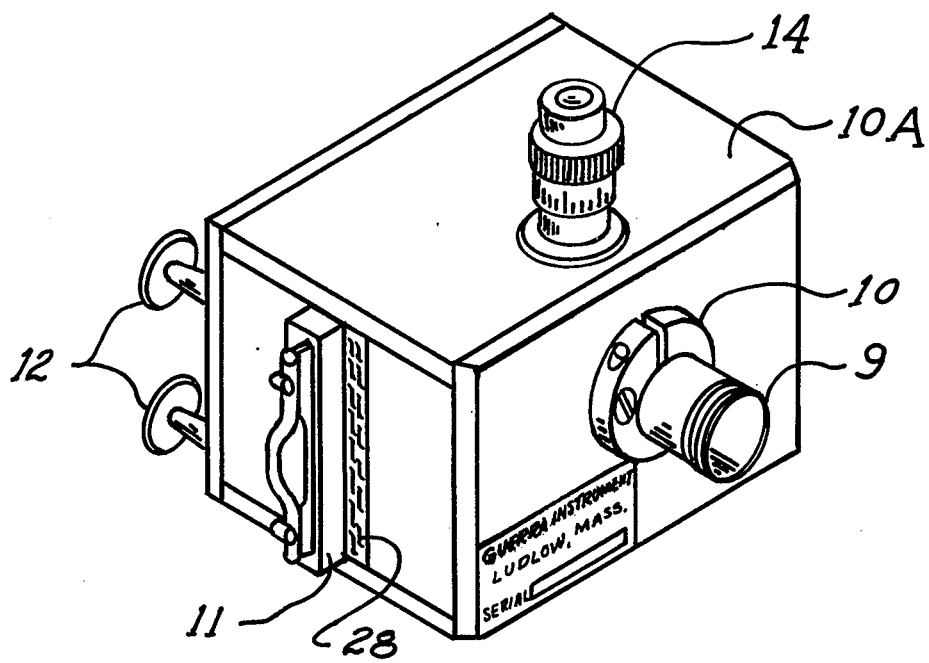
FIG. 5 is a pictorial view of the cryogenic camera, displaying the front of the camera and the filmholder entrance side of the camera, with the filmholder in place.

Light entering the 1¼ inches aperature window 16 in FIG. 2 and FIG. 5 is intercepted by the first-surface coated mirror 1 in FIGS. 2, 3, and 9 when this mirror is in the 45° position. Mirror 1 is epoxied to the ¼ inch diameter steel rod 23 in FIGS. 2 and 9, this rod being ground flat to half its diameter for a 2 inches length at midsection to receive the mirror. The rod is set into a ⅜ inch diameter Plexiglas bearing 22 in FIG. 9 at one end of the camera and protrudes through the opposite side of the camera to the control knob 17 in FIGS. 1 and 4. A ¼ inch I.D. shaft collar 21 in FIGS. 2 and 9 at the Plexiglas bearing end of the rod is notched in two places on the surface facing the bearing to receive a round head tack 22B in FIG. 9 which is imbedded into the surface of the bearing. The position of the notches is such that the rod, and hence the mirror, locks into the 45° observing position and the 0° flip-up position. At the opposite end of the rod, another ¼ inch I.D. shaft collar 19 holds a helical spring 18 at pressure between the camera body wall and the shaft collar itself. In this manner, the spring force causes the mirror to smoothly click into place at the 45° and flip-up positions, as stated above, as the control knob is rotated. The mirror is ¾ inch long, just long enough to intercept a guidable image from the light path and yet clear the Plexiglas optical window 16 and the Plexiglas cross-hair assembly 15 in FIG. 2. When the mirror is in the 45° position, the intercepted portion of the image is reflected up into the Kellner eyepiece 14 in FIG. 3; this eyepiece may be either a fixed-focus 12.5 mm focal length, or a thread-focus 27 mm focal length. But first the light passes through the crosshairs assembly in FIG. 6. This assemble consists of ¼ inch thick optical Plexiglas of 1⅛ inch × 1¼ inch which is beveled on one corner and drilled at this bevel to accept the red light emitting diode 24. This LED is oriented in a direction along the diagonal of the Plexiglas crosshairs unit. The crosshairs are etched into the surface 26 in FIG. 6 (any pattern of lines or letters may be etched in as well) and are thereby illuminated by the LED. The purity of the red light emitted by the LED affects night vision of the observer the least of all the colors in the spectrum, and hence eases eyestrain from long-term visual guiding of the camera. Also, the LED operates on only 3 volts d.c., and draws much less current than the conventional "grain of wheat" bulbs used in most illuminated guide systems. Hence the power supply is portable, economical, and convenient in the form of two 1.5 volt penlight cells and dual penlight cellholder 4 in FIG. 2. Alkaline-manganese cells are used for their good shelf life, high energy (up to twice as much energy as carbon-zinc), and especially for their good low-temperature performance. A potentiometer-switch of 500 ohms is bolted to the camera body, the shaft of which protrudes through the wall and is controlled by the knob 17a in FIG. 4. The potentiometer is part 5 in FIG. 2. The potentiometer varies the LED brightness to suit both the magnitude of the object being viewed and the observer's visual need. By locating the electronic illumination system within the film chamber, the harsh temperatures of the refrigeration chamber space of the camera are avoided; also, more of the volume in the film chamber is occupied, thus allowing less volume for potential moisture-laden air to occupy. Leaving the refrigeration chamber space free of components also allows a thicker wrap of insulation around the chamber.

The type and focal length of the eyepiece chosen (20.0 mm Kellner) afford the widest possible field of view (about 50° apparent field) at the highest guide power possible in this camera design; the Kellner design maintains the quality of the image and is economical at the same time. The crosshairs surface of the Plexiglas crosshair unit is adjacent to and cemented to the inside of the film chamber ceiling, as seen in FIGS. 3 and 2. The eyepiece is epoxied into the hole drilled into the top of the camera directly above the crosshairs unit, as in FIG. 3. The eyepiece is in preset focus on the crosshairs and thus, because the intercepted image comes to a focus on the crosshairs plane, on the image being guided. (As stated above, a low-power 22 mm Kellner with thread focussing may also be employed).

The entire film chamber is then sealed when the filmholder is in place and the hinged back secured with the knobs 12 and 12a in FIG. 1 hand tight. The 1¼ inch aperature on the front of the camera is sealed by the interior placement of the ¼ inch thick Plexiglas optical window 16 in FIG. 2 of 2 inches × 2 inches. This optical window is secured and gasketed by a circumferential ring of silicone rubber adhesive. This pliable bondmount also allows the Plexiglas window to remain independent of the thermal changes of the camera body, thereby avoiding thermal warping of the flat optical surface which would destroy the resolution of the image being photographed. A strip of foam-rubber gasket material is applied to the front end of the filmholder in FIG. 7; this gasket seals the gap between the filmholder and the front wall of the entrance slot, as seen in FIG. 5. The moisture within this entirely sealed film chamber is then absorbed by the silica gel packet 6 visible in FIG. 2 which is secured by a plastic clamp 6a which in turn is epoxied to the interior of the front wall, as seen in FIG. 2. The quantity of silica gel in its muslem sack for breathing efficiency is sufficient to absorb any moisture remaining in the sealed film chamber; therefore, frosting due to moisture condensation and freezing is eliminated. The introduction of the nitrogen gas bleed-off, when liquid nitrogen is used as the refrigerant, into the film chamber also helps to eliminate moisture in the more humid climates.

The adaptor plates 29A in FIG. 7 allow the use of any size of roll film, thus allowing the operator the greater variety of color films and ASA range not found in sheet films. The roll film is cut to the folded template so that the section of the roll film thus obtained is easily fit under the edges of the aluminum adaptor plates, as seen in FIG. 7. The adaptor plates simply slide out of the film holder when sheet film is used.

It will be evident to those skilled in the art that the illustrated embodiments of cryogenic cameras may be altered for certain purposes; in particular, the 1¼ inches adaptor assembly may be replaced by other diameter sizes and other adaptor shapes and geometries for different telescopes, other eyepieces may be employed of different magnification and types, different patterns may be etched on the reticule, other size plateholders may be used with accordingly sized camera bodies, and variations may be made in the refrigeration chamber or electrical illumination system, or in the design of the reflex mirror system. Accordingly, it should be understood that the specific constructional details here illustrated and described are presented for purposes of disclosure rather than as limitations, and that in the appended claims it is aimed to cover all such modifications and equivalencies as fall within the true spirit and scope of the invention.

What I claim as new and desire to secure by Letters Patent of the U.S. is:

1. A self-contained cryogenic camera comprising a hollow Plexiglas rectangular parallelopiped body having a central aperture on a frontplate of said body, a tube and collar assembly attached to said frontplate over said aperture, an entrance slot in the side of said body into which a filmholder is inserted, a hinged Plexiglas back to which is attached an aluminum insulated refrigeration chamber with fittings for the refrigerant entrance and proper ventilation, said back assembly being attached by hinge to the back of said camera body, a sealed film chamber formed by said filmholder and a portion of said body when said hinged back is closed and secured thereby keeping out moisture, a silica gel absorption packet and holder within the said film chamber for absorbing moisture within the sealed film chamber and thereby preventing frosting of the film surface and optical window, a reflex-type off-axis optical guide system contained within said film chamber for directing the image being photographed, an illuminated optical Plexiglas reticle comprising a piece of optical Plexiglas having etched cross-hairs on the surface of the optical Plexiglas and having an LED imbedded in the optical Plexiglas, said Plexiglas rectangular parallel body having an eyepiece aperture on top of the body, said optical Plexiglas reticule being cemented to the inside top of the said body so as to cover the eyepiece aperture, an eyepiece cemented into the said eyepiece aperature so as to protrude from the top of the said body, a penlight-cell power supply and potentiometer switch contained within the said film chambr for powering the said LED, said refrigeration chamber being able to accept any refrigerant material, the refrigeration of the film occurring through thermal conduction by pressure of the aluminum refrigeration chamber against the back of the filmholder, said reflex-type optical guide system including a spring-action rod, collar and bearing assemble the said rod being supported by a plexiglas bearing that is cemented to the inside of the hinge wall of the said body, said bearing having a round head tack inserted into the face of said bearing, a shaft collar with notches drilled into the face of said shaft collar at an angle of 45° apart to accept said round head tack, said rod protruding through the wall opposite to the said hinge wall of the said body, a helical spring on said rod compressed between the said opposite wall and another shaft collar on said rod, said compressed spring causing the rod and notched shaft collar assembly to lock on the said round head tack in two positions 45° apart, a first surface mirror cemented midway along the said rod, said mirror so positioned to lock at a 45° and 0° angle from the top of the said body, said mirror intercepts a portion of the light entering the aperature on the frontplate when said mirror is in the 45° position.

* * * * *